United States Patent
Kolawa et al.

(10) Patent No.: US 9,672,481 B1
(45) Date of Patent: Jun. 6, 2017

(54) SYSTEM AND METHOD FOR AUTOMATICALLY MONITORING THE OVERALL HEALTH OF A SOFTWARE PROJECT

(75) Inventors: Adam K. Kolawa, Bradbury, CA (US); Sang Uk Seong, Sun Valley, CA (US); Marek Kucharski, Cracow (PL); Neel Deepak Gandhi, Los Angeles, CA (US); Wayne P. Ariola, Jr., Los Angeles, CA (US); William C. McCusker, III, Glendora, CA (US); Jason R. Schadewald, Pasadena, CA (US); Daniel J. Dominguez, Azusa, CA (US)

(73) Assignee: Parasoft Corporation, Monrovia, CA (US)

( * ) Notice: Subject to any disclaimer, the term of this patent is extended or adjusted under 35 U.S.C. 154(b) by 281 days.

(21) Appl. No.: 12/908,753

(22) Filed: Oct. 20, 2010

Related U.S. Application Data

(60) Provisional application No. 61/256,525, filed on Oct. 30, 2009.

(51) Int. Cl.
*G06Q 10/00* (2012.01)
*G06Q 10/06* (2012.01)

(52) U.S. Cl.
CPC .................. *G06Q 10/063* (2013.01)

(58) Field of Classification Search
CPC ........ G06Q 10/00–50/00; G06Q 90/00; G06Q 99/00
USPC ................................. 705/7.11–7.42
See application file for complete search history.

(56) References Cited

U.S. PATENT DOCUMENTS

| | | | |
|---|---|---|---|
| 5,784,553 A * | 7/1998 | Kolawa et al. ............... 714/38.1 |
| 6,006,222 A * | 12/1999 | Culliss | |
| 6,473,794 B1 * | 10/2002 | Guheen et al. ............... 709/223 |
| 7,509,627 B1 * | 3/2009 | Ayachitula et al. .......... 717/101 |
| 7,774,743 B1 * | 8/2010 | Sanchez ................. G06Q 10/06 717/101 |

(Continued)

OTHER PUBLICATIONS

Weller, Edward "Using Metrics to Manage Software Projects", IEEE, Sep. 1994, pp. 27-33.*

(Continued)

*Primary Examiner* — Alan S Miller
(74) *Attorney, Agent, or Firm* — Lewis Roca Rothgerber Christie LLP

(57) ABSTRACT

A computer implemented method for monitoring an overall health of a software project. The method includes: providing a plurality of business process checkers; storing a plurality of criteria, wherein each of the plurality of criteria measures an aspect of the software project process; storing an upper bound parameter and a lower bound parameter for each business process checker; assimilating data from one or more data sources related to aspects of the software project process; calculating, by each business process checker, a score for each criterion responsive to said upper bound and lower bound parameters and said data from said one or more data sources; calculating an overall health score for the software project from each calculated score for each criterion; and displaying an indication of the overall health of the software project responsive to the calculated overall health score.

12 Claims, 13 Drawing Sheets

(56) References Cited

U.S. PATENT DOCUMENTS

| | | | | |
|---|---|---|---|---|
| 7,890,814 | B2* | 2/2011 | Zhang | G06F 11/366 |
| | | | | 714/25 |
| 8,032,863 | B2* | 10/2011 | Kolawa | G06F 11/3616 |
| | | | | 717/124 |
| 8,225,270 | B2* | 7/2012 | Frasher | G06F 11/3616 |
| | | | | 705/7.16 |
| 2002/0174005 | A1* | 11/2002 | Chappel | 705/10 |
| 2003/0041288 | A1* | 2/2003 | Kolawa et al. | 714/38 |
| 2004/0103396 | A1* | 5/2004 | Nehab | 717/127 |
| 2005/0015675 | A1* | 1/2005 | Kolawa et al. | 714/38 |
| 2006/0123389 | A1* | 6/2006 | Kolawa et al. | 717/101 |
| 2006/0195330 | A1* | 8/2006 | Bogner et al. | 705/1 |
| 2007/0271483 | A1* | 11/2007 | Kolawa et al. | 714/38 |
| 2008/0034347 | A1* | 2/2008 | V et al. | 717/101 |
| 2008/0046484 | A1* | 2/2008 | Ellis | G06Q 10/063 |
| 2008/0255696 | A1* | 10/2008 | Chaar et al. | 700/108 |
| 2009/0006147 | A1* | 1/2009 | Padmanabhan | 705/7 |
| 2010/0003645 | A1* | 1/2010 | Hathaway | 434/107 |
| 2011/0270639 | A1* | 11/2011 | Blackwell et al. | 705/7.11 |

OTHER PUBLICATIONS

Paul, Raymond A.; Kunii, Tosiyasu L.; Shinagawa, Yoshihisa; Khan, Muhammad F. "Software Metrics Knowledge and Databases for Project Management", IEEE Transactions on Knowledge and Data Engineering, vol. 11, No. 1, Jan./Feb. 1999.*

Wu, Ching-Seh "Software Project Plan Tracking Intelligent Agent" UMI, Dec. 2000.*

Wu, Ching-Seh; Simmons, Dick B. "Software Project Planning Associate (SPPA): A Knowledge-Based Approach for Dynamic Software Project Planning and Tracking", IEEE, 2000.*

* cited by examiner

| Service Name | Status | Links |
|---|---|---|
| Bug Checker | | |
| • New Defect/Resolved Ratio is higher than lower bound threshold (0)<br>• New Defects/Defects Resolved: 1/1 | | |
| Defect Tests Checker | | |
| • # of Test Failed Defects is 40 | | |

FIG. 3

| | | |
|---|---|---|
| Source Checker | | |
| CodeReview Checker | | |
| Build Checker | | |

FIG. 4A

| Service Name | Status | Links |
|---|---|---|
| Source Checker<br>• Previous Drop's Code Count: 6004608<br>• Current Drop's Code Count: 6004577<br>• Difference: 31<br>• # of Developers: 5 | | |
| | 0.5 | Documentation<br>Concerns<br>Report |
| CodeReview Checker<br>• Issues per developer: 3.8<br>• Outstanding reviews per developer: 7<br>• Issues threshold: 4.0% ~ 8.0%<br>• Outstanding tasks: 4.0% ~ 8.0% | | |
| | 0.5 | Documentation<br>Concerns<br>Report |
| Build Checker | 1.0 | Documentation<br>Concerns<br>Report |

FIG. 4B

Confidence Factor Checker

Project Iterations Checker

| ID | Name | Planned End Date | Est. End Date |
|---|---|---|---|
| 355 | Load Test 6.2 Release Lower Priority | 2009-09-30 | 2009-10-06 |
| 366 | SOAtest 6.2 Release - September | 2009-09-30 | 2009-10-13 |
| 337 | SOAtest 6.2 Release - August | 2009-08-31 | 2009-09-17 |
| 352 | SOAtest 6.2 - 3rd Party - August - Sept | 2009-09-30 | 2009-10-08 |
| 360 | SOAtest 6.2 - 3rd Party - Lower Priority | 2009-09-30 | 2009-10-21 |
| 246 | SOAtest 6.2 - Stubs on EQR | 2009-09-07 | 2009-10-02 |

• Lower Bound ~ Upper Bound: 0.0% ~ 30.0%

Running Budget Checker

| ID | Name | Running Budget | Cost | Decision Value |
|---|---|---|---|---|
| 354 | SOAtest 6.2 Release Lower Priority | 15 | 39 | -24 |
| 366 | SOAtest 6.2 Release - September | 63 | 73 | -10 |
| 337 | SOAtest 6.2 Release - August | 188 | 272 | -84 |
| 360 | SOAtest 6.2 - 3rd Party - Lower Priority | 19 | 30 | -11 |

• Lower Bound ~ Upper Bound: -10.0 Days ~ 0.0 Days

Earned Value Checker

| ID | Name | Running Budget | Earned Value | Decision Value |
|---|---|---|---|---|
| 354 | SOAtest 6.2 Release Lower Priority | 15 | 0 | -15 |
| 355 | Load Test 6.2 Release Lower Priority | 8 | 0 | -8 |
| 366 | SOAtest 6.2 Release - September | 63 | 9 | -54 |
| 367 | Load Test 6.2 - September | 9 | 2 | -7 |
| 337 | SOAtest 6.2 Release - August | 188 | 124 | -64 |
| 352 | SOAtest 6.2 - 3rd Party - August - Sept | 23 | 5 | -18 |
| 360 | SOAtest 6.2 - 3rd Party - Lower Priority | 19 | 0 | -19 |
| 246 | SOAtest 6.2 - Stubs on EQR | 74 | 52 | -22 |

• Lower Bound ~ Upper Bound: -10.0 Days ~ 0.0 Days

Task Testing Policy Checker

| ID | Name | Tasks List |
|---|---|---|
| 337 | SOAtest 6.2 Release - August | • Test Failed: |
| 246 | SOAtest 6.2 - Stubs on EQR | • Test Failed: |

FIG. 6

SYSTEM AND METHOD FOR AUTOMATICALLY MONITORING THE OVERALL HEALTH OF A SOFTWARE PROJECT

CROSS REFERENCE TO RELATED APPLICATIONS

This Patent Application claims the benefits of U.S. Provisional Patent Application Ser. No. 61/256,525, filed on Oct. 30, 2009 and entitled "System and Method for Automatically Monitoring The Overall Health of a Software Development Project," the entire content of which is hereby expressly incorporated by reference.

FIELD OF THE INVENTION

The present invention relates generally to computer software; and more particularly to a system and method for automatically monitoring the overall health or quality of a software project.

BACKGROUND

Previously, software development decision makers lacked the objective information needed to make informed decisions. Recently, many mechanisms of collecting metrics have evolved—so much so, in fact, that decision makers are now flooded with more information than they can interpret in an appreciable amount of time.

Put simply, software development managers need to focus on the most pressing needs of their projects. Assuming that the data is available, those managers must examine any collected metrics and interpret several dynamic variables with respect to each other and to prior values over various time intervals. After analyzing that data, the manager needs to determine the best course of action to keep the project on track to meet its deadline. Since the process of interpreting this data could easily take more than a day, the data is likely be outdated by the time the interpretation is complete and the appropriate action is determined.

As the software systems increase in size and complexity, it is unrealistic to expect any one person to be technically proficient in the details of each individual system component. Furthermore, to the degree to which this technical proficiency is embodied in individuals, if every process in the development cycle needs to go through these people, they become bottle-necks in assuring the functional requirements of the system. For example, there are many meetings, some information is stored in a requirements management system, some is stored in a defect management system, some is stored in Word documents, some is stored in emails. As a result, it's impossible to get the whole story. This reduces the flexibility and agility of the organization, inhibiting its ability to quickly adapt to changing business conditions. Furthermore, there is a problem in the industry that when business analysts write requirements, they never know when the requirements are completed and they never get a chance to see if the requirements are implemented properly.

In the current market, there is a growing number of technologies that collect and display data. However, there remains a need for technologies that automatically analyze that data and present it in a format that allows and even encourages the best action to be taken by the development team.

SUMMARY

In some embodiments, the present invention is a computer implemented method for monitoring an overall health of a software project. The method includes: providing a plurality of business process checkers; storing a plurality of criteria, wherein each of the plurality of criteria measures an aspect of the software project process; storing an upper bound parameter and a lower bound parameter for each business process checker; assimilating data from one or more data sources related to aspects of the software project process; calculating, by each business process checker, a score for each criteria responsive to said upper bound and lower bound parameters and said data from said one or more data sources; calculating an overall health score for the software project from each calculated score for each criteria; and displaying an indication of the overall health of the software project responsive to the calculated overall health score.

In some embodiments, the present invention is a computer implemented method for monitoring an overall health of a software project. The method includes: storing a plurality of business rules, wherein each of the plurality of business rules is a quality indication of an aspect of the software project process; storing an upper bound parameter and a lower bound parameter for each business rule; executing one or more business process checkers with data from one or more data sources related to aspects of the software project process to determine a score for each business rules responsive to said upper bound and lower bound parameters; and calculating and displaying an indication of the overall health of the software project responsive to the calculated score for each business rules.

The indication of the overall health of the software project may be depicted in three different colors displayed as three lights, or as graphical or text representations.

In some embodiments, the criteria and the business rules are implemented in BPEL.

BRIEF DESCRIPTION OF THE DRAWINGS

FIG. 3 depicts some exemplary defect-related checkers, according to some embodiments of the present invention.

FIGS. 4A and 4B show some exemplary build/source-related checkers (e.g., shows graphical and text views from two different projects), according to some embodiments of the present invention.

FIG. 6 shows some exemplary project iteration checkers, according to some embodiments of the present invention.

DETAILED DESCRIPTION

In some embodiments, the present invention is a system and method for automatically monitoring the overall health of a software project. The invention defines several criteria, each of which measures an aspect of the software project process. The aspects of the process may be related to different life cycles of the software, for example, design, development, deployment, management and monitoring. Each criterion assimilates data from one or more sources and determines whether, and to what extent, a resulting calculation warrants corrective action. Finally, the invention determines an overall score and electronically notifies (for example, by emails) the specified personnel of the results.

The invention collects information about the software life cycle from different tracking systems (e.g., source control, bug tracking, reporting, etc) and applying project specific settings and metrics to determine the overall health of a software project. A more detailed description of integrating the test results for different life cycles of the software is disclosed in U.S. Pat. No. 7,596,778, and entitled "Method and System for Automatic Error Prevention for Computer Software," the entire content of which is hereby expressly incorporated by reference.

Figure 1A:
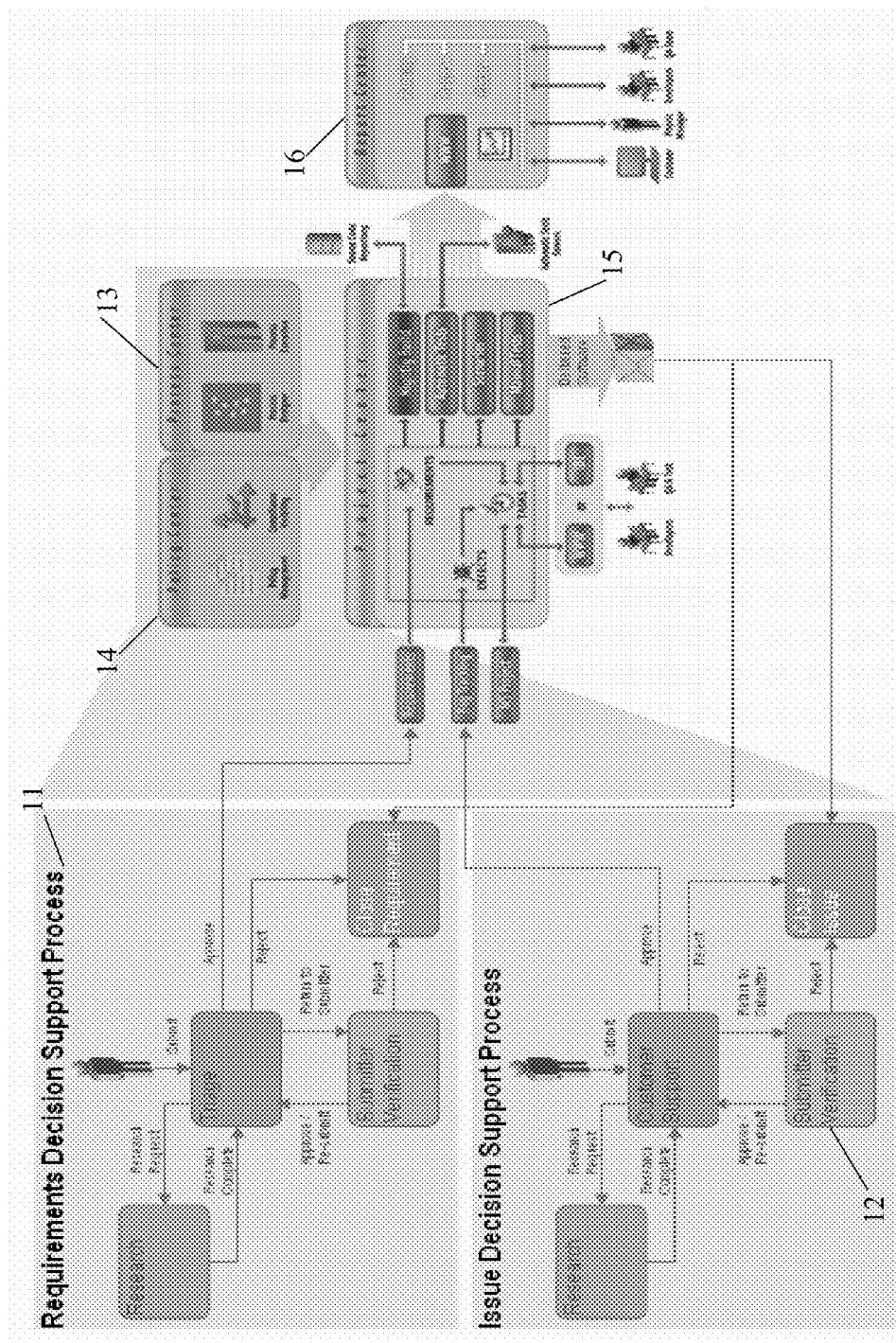
FIG. 1A is an exemplary block diagram depicting data collected from disparate parts of the software development infrastructure, according to some embodiments of the present invention.

FIG. 1A is an exemplary block diagram depicting data collected from disparate parts of the software development infrastructure, according to some embodiments of the present invention. The results are then sent to project management for review. Block 11 depicts an organization's exemplary requirements gathering process. A requirement, for example, a profit/loss statement, is submitted to a triage. The triage may be a fully automated process running on a computer or a person using automation tools running on one or more computers. The triage may approve the requirement and electronically send it to a project center 15, or may reject the requirement and close it. The triage may decide that the requirement may need some research before it is approved or considered for approval. In this case, the submitted requirement is electronically sent for research and when the research is completed, the requirement is electronically sent back to the triage to make a decision to approve or reject it. The triage may also electronically send the requirement for verification of its submitter, before it is approved or rejected. In some embodiments, the outgoing arrows in block 11 represent different software commands (e.g., buttons) running on a computer for the triage to perform the above-mentioned tasks on the requirement.

Block 12 shows an exemplary issue decision support process. An issue or a software bug is electronically submitted to a customer support team member using a computer. The customer support may approve the issue and electronically send it to the project center 15, or may reject the issue and close it. The customer support may decide that the issue may need some research before it is approved or considered for approval. In this case, the submitted issue is electronically sent for research and when the research is completed, the issue (bug) is electronically sent back to the customer support (computer) to make a decision to approve or reject it. The customer support may also electronically send the issue for verification of its submitter, before it is approved or rejected. In some embodiments, the outgoing arrows in block 12 represent different software commands (e.g., buttons) running on a computer for the customer support to perform the above-mentioned tasks on the issues or software bugs.

Block 13 shows an exemplary process center that provides a software tool (running on a computer), which allows building business process, for example, Business Process Execution Language (BPEL) processes. The process center includes a Business (e.g., BPEL) process engine which executes the created business processes. BPEL is design for communicating information from computers/people to people/computers by utilizing the Web Service Description Language (WSDL) standard. All services that are accessed through BPEL are done so through the abstract interface described in WSDL.

Block 14 shows an exemplary policy center for storing the created business processes (in a database), which can then be activated. In other words, Policy center 14 includes a process repository.

Block 15 shows a project center for managing the requirements and the issues/bugs. It includes a requirement management system with a database for storing the requirements and their description, any decision, and the history of the decisions. The project center 15 also includes an issue/bug management system with a database for storing the issues/bugs/defects and their histories. A set of tests and nightly build tests are then executed on one or more computers to monitor that the tasks are implemented properly.

Block 16 is a report center for generating reports for a variety of tasks, such as planning, progress, history, etc. for different users, such as customers, project managers, developers, QA team, etc. Once a requirement has passed through the requirements gathering process and been approved, it is set in motion by injecting it into the team's preferred requirements system (for example, DOORS™, RequisitePro™, Parasoft Concerto™, etc,) to send the requirement to the appropriate people/tools, which then it can be converted to tasks.

The project manager can be notified of the health score, for example, the health score may be automatically emailed to the project managers can so they can quickly determine what actions to take. If the project suffers from poor health, can access additional information explaining why the poor health score was assigned. The managers can also drill down into specific checks to the exact piece of data responsible for the bad score. Armed with this information, management can take specific action to address the specific problem a project is encountering. If the project is in good health, then no action need be taken and valuable time that would have been otherwise spent manually browsing and applying ad-hoc metrics can be utilized elsewhere.

Figure 1B:
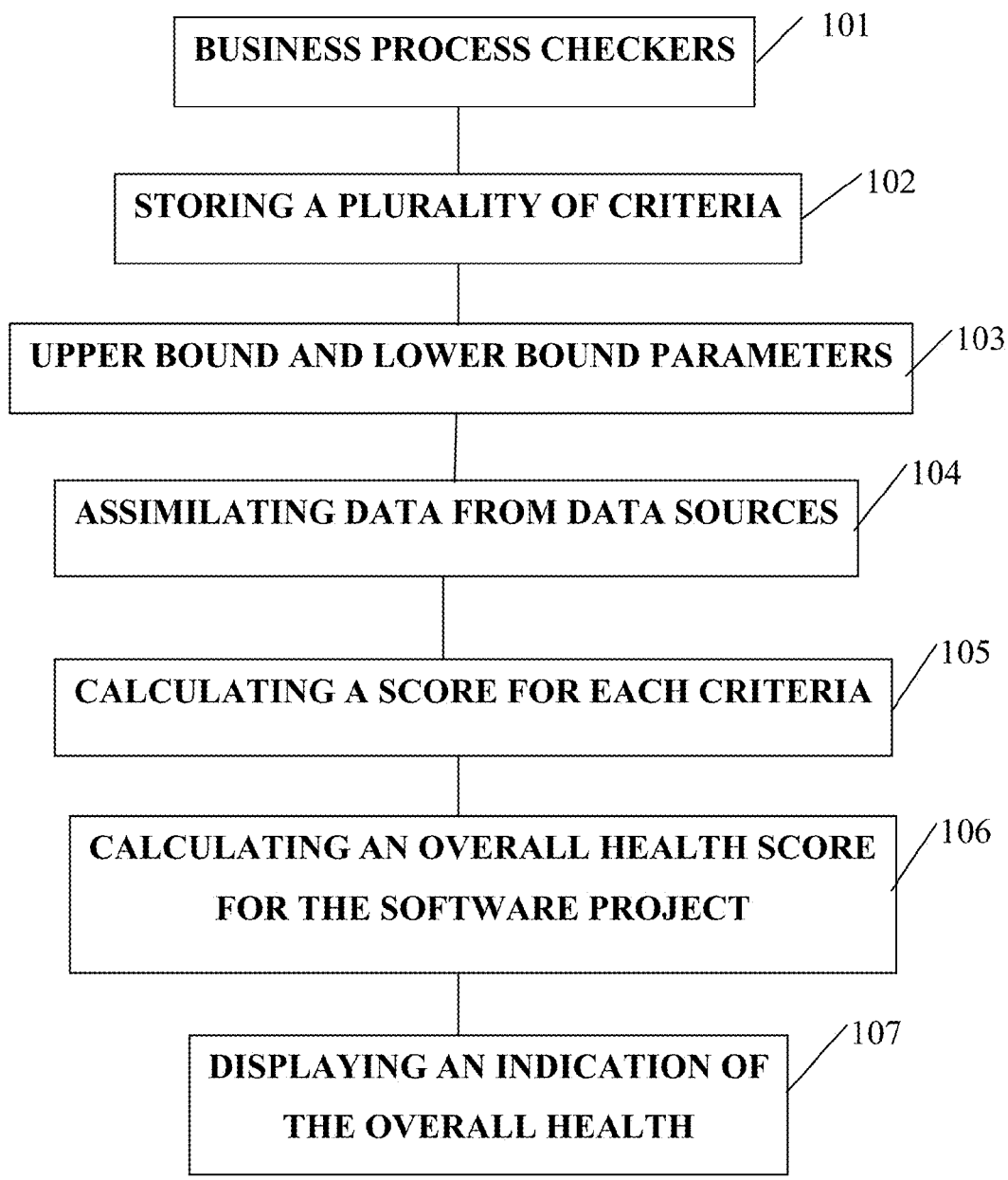
FIG. 1B is an exemplary simplified process flow, according to some embodiments of the present invention.

FIG. 1B is an exemplary simplified process flow, according to some embodiments of the present invention. A plurality of business process checkers are provided in block 101 and a plurality of criteria, for example, business rules, are stored in block 102. Parameters such as an upper and a lower bound of the threshold of values that are acceptable for a respective checker are stored in block 103. In block 104, data, such as data representing graphs and test statistics are assimilated from one or more data sources configured to store data from testing and validation processes for each stage of the software process. In block 105, a score for each criteria is calculated mathematically and/or heuristically, and then an overall health score for the software project is calculated based of the score for each criterion in block 106. In block 107, an indication of the overall health of the software project responsive to the calculated overall health score, for example, in three colors, is displayed.

Figure 1C:
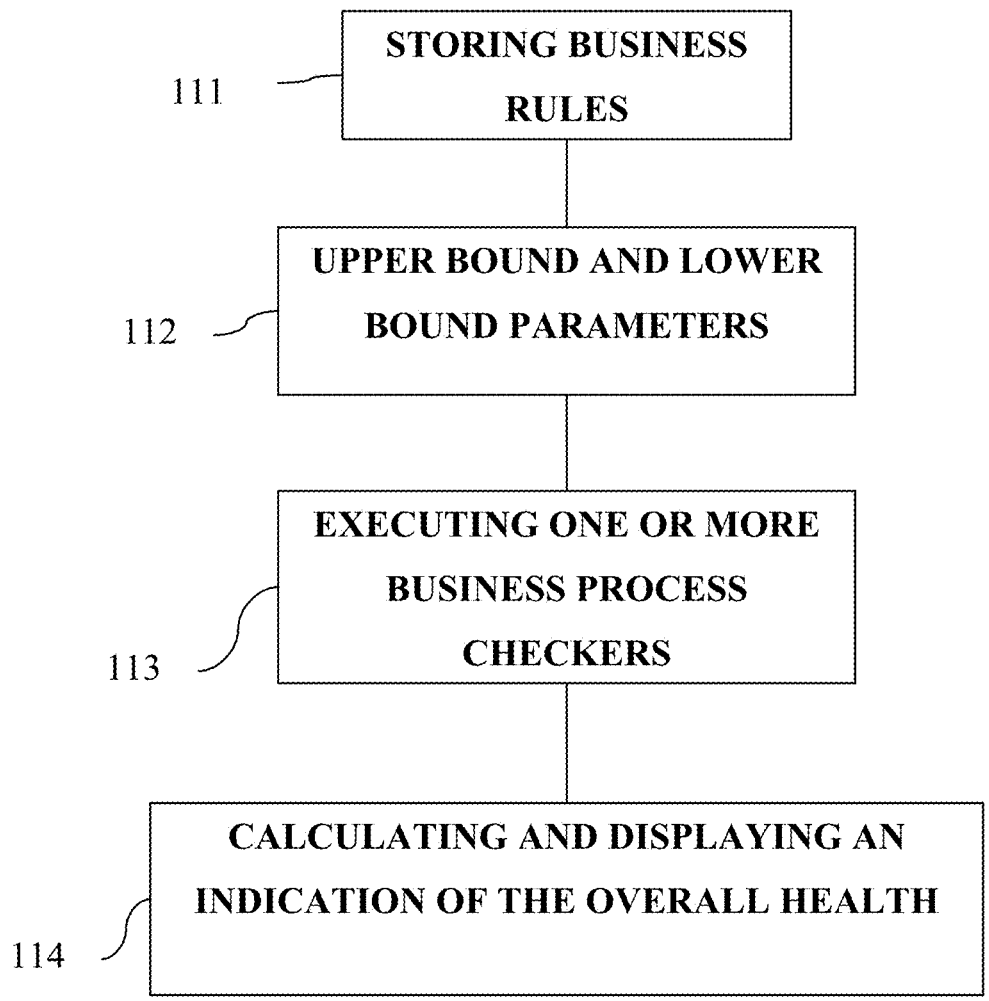
FIG. 1C is an exemplary simplified process flow, according to some embodiments of the present invention.

FIG. 1C is an exemplary simplified process flow, according to some embodiments of the present invention. A plurality of business rules are stored in block 111. The business rules may be implemented in BPEL. Parameters such as an upper and a lower bound of the threshold of values that are acceptable for a respective checker are stored in block 112. One or more business process checkers are executed with data from one or more data sources related to aspects of the software project process to determine a score for each business rules based on the upper bound and lower bound parameters, in block 114. An indication of the overall health of the software project is calculated and displayed responsive to the calculated score for each business rules, in block 114.

In some embodiments, the invention's utilization of open frameworks sets it apart from related technologies. The invention is largely agnostic in that it interacts with open source technologies and formats. It integrates with a wide variety of software development tools and technologies, and also integrates into the entire Software Development Life Cycle (SDLC). This enables management to obtain a tremendous wealth of information across the entire project's life cycle—delivered as a concise report.

The present invention includes two main parts: a data source module and a data analysis (HealthCheck Processes) module. The invention takes data from the data source, such as data representing graphs and test statistics and heuristically determines a conclusion (e.g., Green, Yellow, and/or Red), based on a set of (business) rules. This eliminates the burden on the users/developers to take time to analyze each graph and manually reach a conclusion. An exemplary data source and reporting system and method are disclosed in a co-pending and co-owned U.S. application Ser. No. 11/282, 542, and entitled "Method and System for Group Test Reporting," the entire content of which is hereby expressly incorporated by reference.

In some embodiments, the data source is provided in XML format by Parasoft Concerto's™ Report Center component. A description of the Parasoft Concerto's™ Report Center component is provided on www.parasoft.com, the entire content of which is hereby expressly incorporated by reference. The data source manages activities from various policies (for example, defects, features, source control activity, build, testing, and iteration tasks).

In some embodiments, predefined business process (expressed using the BPEL language) are executed to analyze and check if the data source is within the bounds of the threshold set for that data source. In these embodiments, there are several checker processes available to be configured, including, but not limited to: BugChecker, BuildChecker, CodeReviewChecker, ConfidenceChecker, DefectTestsChecker, EarnedValue Checker, ProjectIterationChecker, RegressionTestChecker, RunningBudgetChecker, SecurityTestChecker, SourceChecker, TaskTestingPolicyChecker, UnitTestChecker, and UnitTestCoverageChecker.

Figure 2:
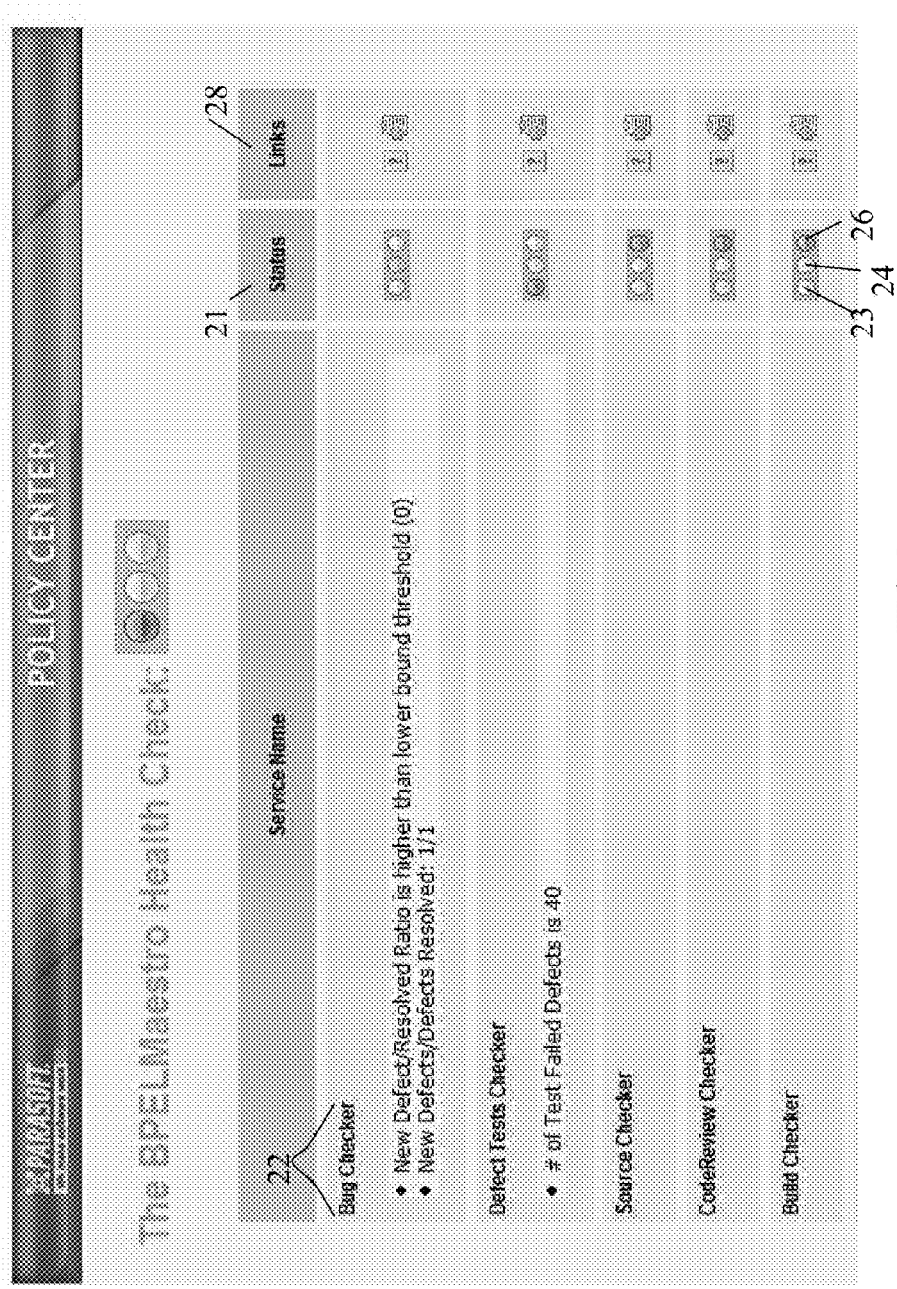
FIG. 2 is an exemplary display screen illustrating a health score, according to some embodiments of the present invention.

FIG. 2 is an exemplary display screen illustrating a health score, according to some embodiments of the present invention. As shown, a number of the relevant checker processes 22 are displayed with brief description of the checker. The status 21, and relevant links 28 for obtaining more information about the checker processes are also displayed. The status is an indication of the overall health of the software project, which is depicted as three colors, Red 26, Yellow 24, and Green 23, similar to a traffic light.

Each checker defines parameters such as the upper and lower bound of the threshold of value that is acceptable for that checker and the warning or error stage (defined, for example, in Green 1.0, Yellow 0.5 and Red 0.0 signals). HealthCheck Process can be configured to match the development team's defined policy by turning checkers on and off. The overall HealthCheck result is calculated by multiplying all checkers' results. In some embodiments, if any checker returns Red, the overall HealthCheck will automatically be Red.

The following is a description of some of the exemplary checkers.

Defect-Related Checkers

BugChecker checks the ratio of new bugs and fixed bugs on the given day, or a time period. For example, if the ratio is greater than the upper bound, it means that more bugs were filed than fixed. This indicates that the project may be experiencing "defect creep" and should be reviewed.

DefectTestsChecker checks to ensure that every defect has at least one test case associated with it—and that the test successfully passes during the nightly test. For instance, if the test case associated with a defect fails, this indicates that a serious regression was introduced. This problem needs to be reviewed as soon as possible. Without any tests associated with a defect, it is not possible to automatically check whether code modifications re-introduced the defect. This needs to be reviewed as a second priority (e.g., a Yellow) issue. If the ratio of unresolved defects is higher than the threshold, it needs to be reviewed (e.g., a Yellow). FIG. 3 depicts some exemplary defect-related checkers, according to some embodiments of the present invention.

Build/Source-Related Checkers

BuildChecker checks for compilation errors and warning messages from the nightly integration build. This safeguards against code migration problems as well as error or warning message creep.

CodeReviewChecker checks compliance to the code review policy. For example, if members of the development team delay code review, the checker will generate an alert. It compares the rates of outstanding code reviews and code review issues from the current day to those from the previous day. For example, if the rate of issues and outstanding reviews is above the upper threshold, the checker will be set to an error (e.g., Red).

SourceCodeChecker checks to ensure the software project's code base is increasing in size. For instance, if the total code base size is larger than it was in the previous drop, the checker returns Green. Otherwise, it looks at the difference between the previous drop and the current drop. If the difference is greater than, for example, 100 lines per developer, it triggers Red; otherwise, it activates Yellow. Although, in this description, green, yellow, and red colors are used to visually display errors less than the threshold, closed to the threshold and more than the threshold, respectively, other indications such as graphical icons, text indications, other colors, or combinations thereof may be used.

FIGS. 4A and 4B show some exemplary build/source-related checkers (e.g., shows graphical and text views from two different projects), according to some embodiments of the present invention.

Test Checkers

RegressionTestChecker checks the project's overall test failure ratio. For example, if the overall test failed count/overall test count*100 is greater than the upper bound, a Red is displayed. If the overall test failed count/overall test count*100 is less than the lower bound, a Green is shown. If the ratio percentage falls between thresholds, a Yellow is displayed.

SecurityTestChecker checks the project's security test failure ratio. This ratio is based on security test failures per a number of, for example, 1000 lines of code.

StaticAnalysisTestChecker checks the overall static analysis violation ratio, for example, per 1000 lines of code.

UnitTestChecker checks that unit tests run consistently and cleanly. It reports an error if the total number of test cases is lower than the maximum test cases for the last, for example, 10 drops or if the test failure ratio exceeds the threshold.

Figure 5:
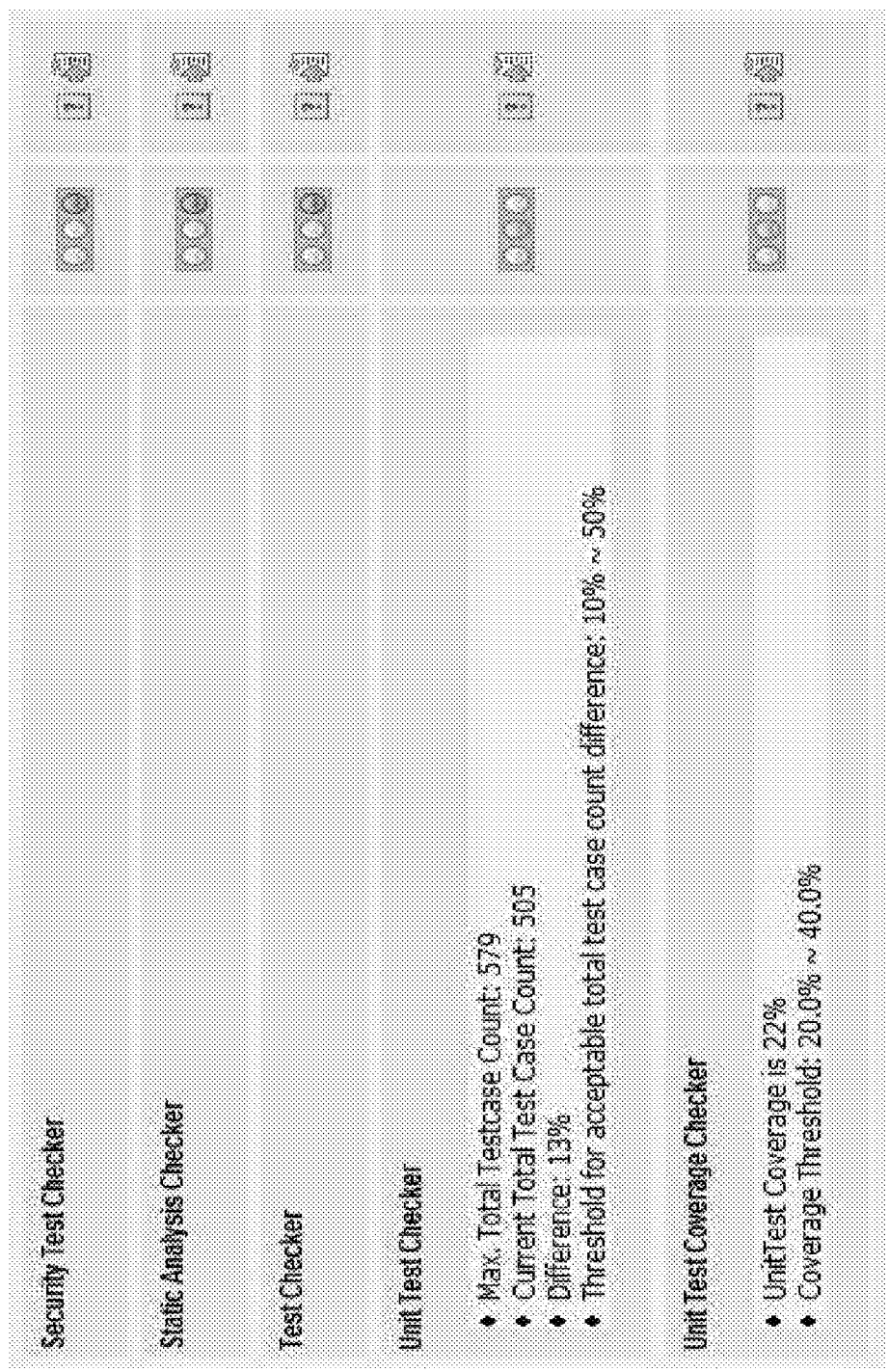
FIG. 5 depicts some exemplary test checkers, according to some embodiments of the present invention.

UnitTestCoverageChecker checks for unit test coverage based on the threshold. If the coverage is lower than the threshold, it reports an error. FIG. 5 depicts some exemplary test checkers, according to some embodiments of the present invention.

Project Iteration Checkers

ProjectIterationChecker checks for any iteration with a deadline due date that is out of bounds. For example, if any iteration is out of bounds, the entire checker returns error (Red). The checker also reports detailed information about all failed iterations.

RunningBudgetChecker checks to see whether "today's" (current) running budget is on track. Running budget expresses how much budget is allocated for the iteration as of the current day. Cost is the actual total working time as of the current day. A running budget that is higher than the cost indicates that the team is efficient and the iteration is running under budget.

EarnedValueChecker checks to ensure that the earned value for iterations is under control. For example, Earned Value is calculated as a sum of all actual working units (for example, days or hours) of completed tasks. For example, if the difference between Earned Value and Running Budget is greater than the upper bound threshold, the iteration is efficient.

TaskTestingPolicyChecker checks each task in each iteration and indicates if any tasks need to be reviewed. For instance, if a closed task with "passed" status is marked with a change-based testing flag, retesting is required, and a Yellow is displayed. If a closed task with "not tested" status" is marked with a change-based testing flag, it means that there is a test case that hasn't yet been tested. This is also marked as Yellow. If a closed task with "not tested" status does not have a change-based testing flag, it means that there are no test cases for the task and a Red color is displayed indicating an error. If a closed task has a "test failed" status, it will also be Red indicating an error.

ConfidenceFactorChecker checks the project's confidence factor rating (based on mathematical calculation) for last, for example, 10 drops. FIG. 6 shows some exemplary project iteration checkers, according to some embodiments of the present invention.

In some embodiments, the confidence factor is an objective indication of the code quality, for example, a quality rating of the entire code that takes into account the verification results of each of the verification tools that was executed on the code, the number of test cases run, the success of failure of the test cases, with respective to each developer and the entire development team.

In some embodiments, the confidence factor is a number that is correlated to the chance of the software system working correctly for any task. The confidence factor is a precise objective quantity. Every system has a unique confidence factor—whether or not that level is known. Because the confidence factor is a objective property, one can measure it using typical experimental tasks. The most efficient way to do this is to set up an automatic system.

For example, one can assess a system's confidence factor as follows:
Carefully define the different tasks that the system needs to perform.
Apply these tasks to the system.
Determine how many of these tasks the system executes correctly.
Calculate the confidence factor (C) by plugging results into equation 1 (below), where p represents the number of passing test cases and t represents the total number of test cases.

$$C = p/t \times 100 \qquad (1)$$

The process for determining the confidence factor resembles the quality assurance (QA) process in that, both involve determining system tasks, creating test cases that represent those tasks, executing the test cases, and checking the results. Consequently, an infrastructure that produces a confidence factor can be built upon an existing QA framework without extravagant effort or cost. QA departments have been performing most of these steps for years, but information technology (IT) departments have not really tried to use QA's test suites to help management make informed deployment decisions. If a software system has a 95% confidence factor, this means that it should be able to execute the required tasks flawlessly about 95% of the time. A more detailed description of a confidence factor is described in U.S. Pat. No. 7,596,778, and entitled "Method and System for Automatic Error Prevention for Computer Software," the entire content of which is hereby expressly incorporated by reference.

In some embodiments, the invention allows conditions (for example criteria/business rules) in a BPEL process to be edited and changed in real time to reflect changing business needs. For example, a business analyst can log in and edit process conditions through an easy-to-use user interface. The conditions are displayed using human-readable strings on top of XPath so that the business analyst need not know anything about the BPEL or XPath details and can simply edit the conditions using clear human-readable logic. The new conditions then get used by the currently running processes as well as future processes.

In some embodiments, the business rules work by allowing a process author to define short hands for BPEL expressions which a business analyst can then use to control when conditional statements evaluate to true or false. When a rule is set to a new expression, or the upper and/or lower bound parameters are changed, by a business analyst, they are instantly used by all currently running and future processes. When the process encounters a business rule, it checks an external source for the actual condition e.g., the upper and/or lower bound parameters), there by allowing all running processes to be updated with the new expression on the fly.

Figure 7:
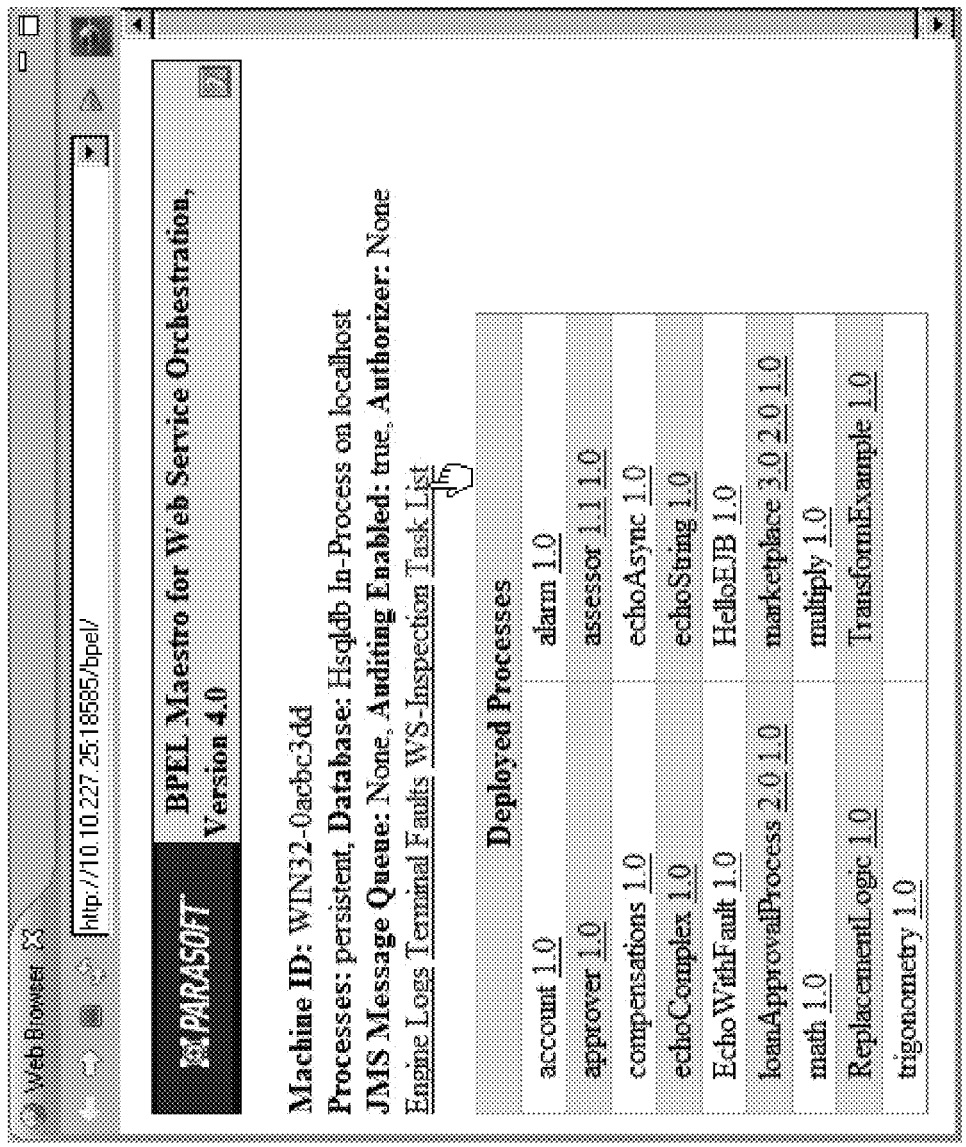
FIG. 7 is an exemplary user interface for a business analyst, according to some embodiments of the present invention.

FIG. 7 is an exemplary user interface for a business analyst, according to some embodiments of the present invention. In some embodiments, the user interface is invoked by selecting a URL node from a Viewer and clicking the Browse button. The user interface then opens in the editor view. By clicking the Task List link within the interface, login screen displays. After logging in, a list of processes and version links are displayed for the various processes that have editable conditions. Only those conditions of interest need to be exposed so that conditions in the process that are unimportant to business logic may remain hidden. By clicking on a process link, an image representing the BPEL process is displayed, as shown in FIG. 8.

Figure 8:
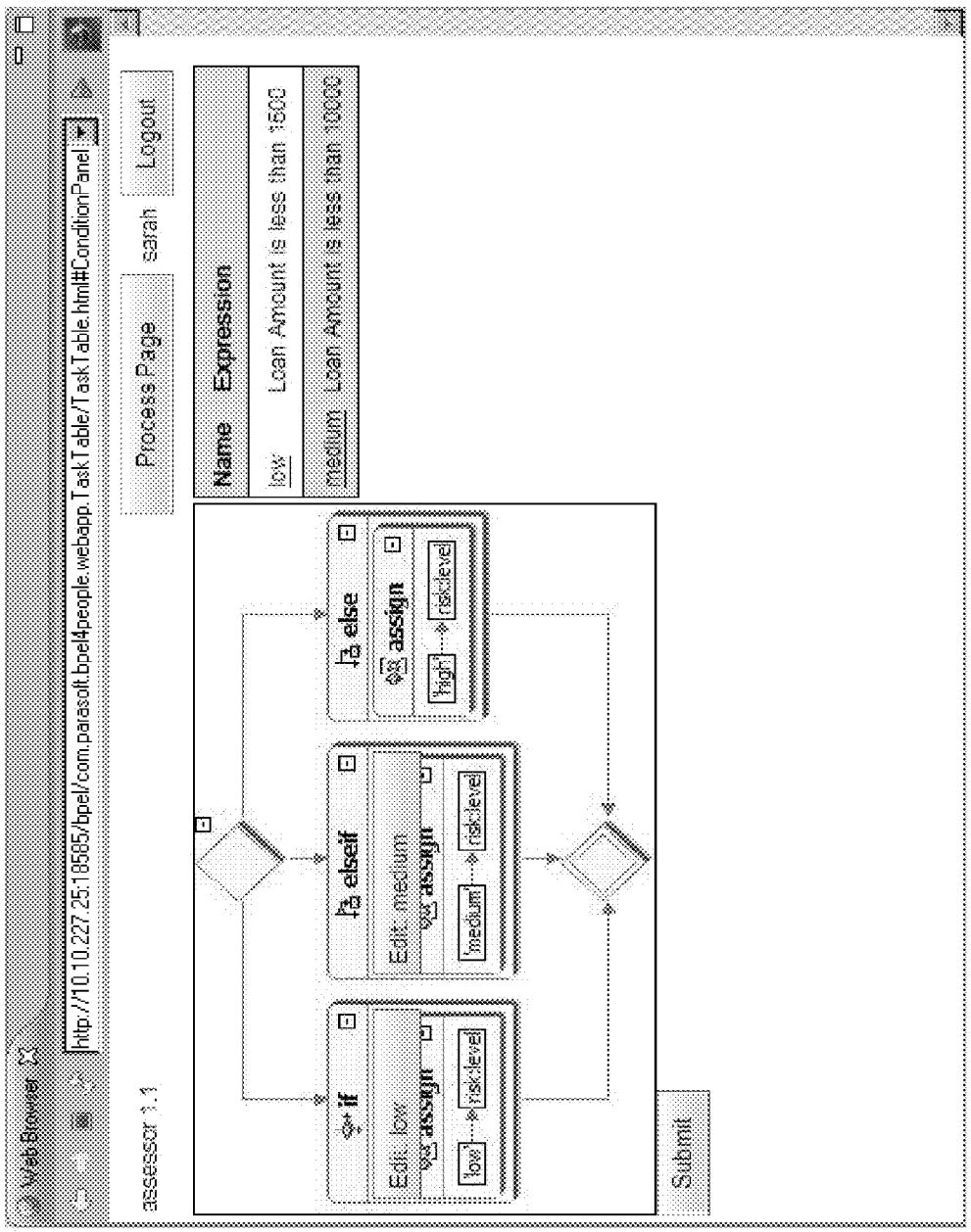
FIG. 8 is an exemplary screen for graphically displaying one or more BPEL processes, according to some embodiments of the present invention.

FIG. 8 is an exemplary screen for graphically displaying one or more BPEL processes, according to some embodiments of the present invention. The exposed conditions can be edited from this screen, as shown in FIG. 8. A table also displays the settings for all editable conditions. For example, by clicking on a condition button in the image, or by clicking a link from the table, a Condition Editor screen (FIG. 9) displays a human-readable condition that can be configured to use different values or conditions.

Figure 9:
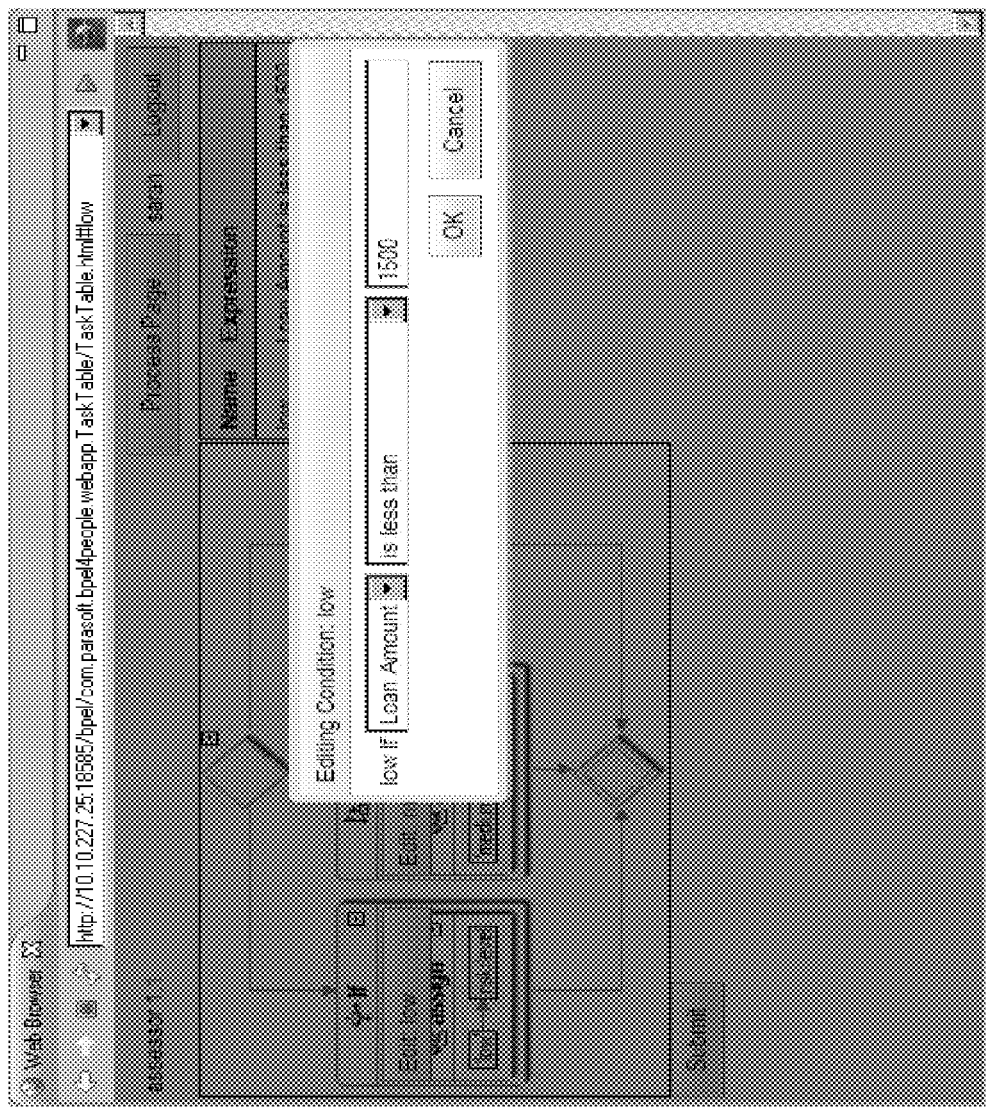
FIG. 9 is an exemplary screen for editing conditions in a BPEL process, according to some embodiments of the present invention.

FIG. 9 is an exemplary screen for editing conditions in a BPEL process, according to some embodiments of the present invention. The settings in the Condition Editor are configured and the OK button is selected. In some embodiments, the condition editor has three sections: variable, condition and value. The variables are human-readable strings that correspond to a variable or XPath expression in BPEL. The conditions are human-readable logic conditional statements. The values can be a predefined enumeration or a simple text box. By clicking the Submit button in the interface, any changes made are sent to the engine. The currently running process and future processes will use the new values when evaluating conditions.

To create an environment variable, Right-click an if or elseif element in the model or outline view and select Set Environment Variable from the shortcut menu that appears. A Create New Environment Variable dialog displays, as shown in FIG. 10.

Figure 10:
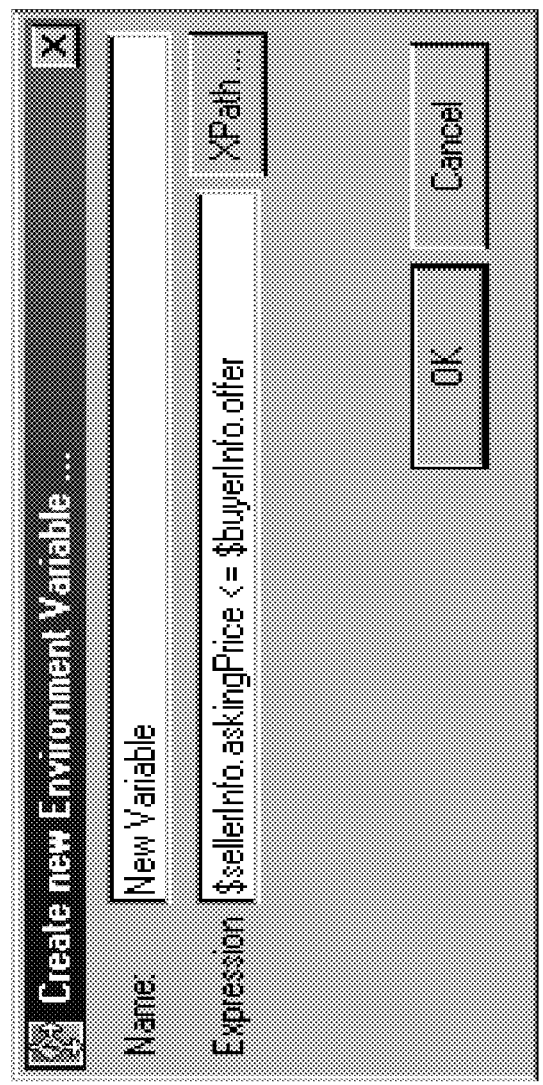
FIG. 10 is an exemplary dialog box for creating en environmental variable in a BPEL process, according to some embodiments of the present invention.

FIG. 10 is an exemplary dialog box for creating en environmental variable in a BPEL process, according to some embodiments of the present invention. In the Create New Environment Variable dialog:
  Name: Specify or edit the name of the environment variable.
  Expression: Specify or edit the XPath expression by either manually typing in the new expression or clicking the XPath button to bring up the) (Path Editor which offers more robust features.
  When finished, click the OK button. Changes are committed and stored in an XML file named environment. If the file doesn't already exist, then the new file is created.

In order to make the XPath expressions more human readable in the analyst user interface, variable mappings can be defined before deployment. Variable mappings include a human readable name to replace the $variable.[part]//expression syntax and possible default values that the user can easily select in the analyst user interface.

Figure 11:
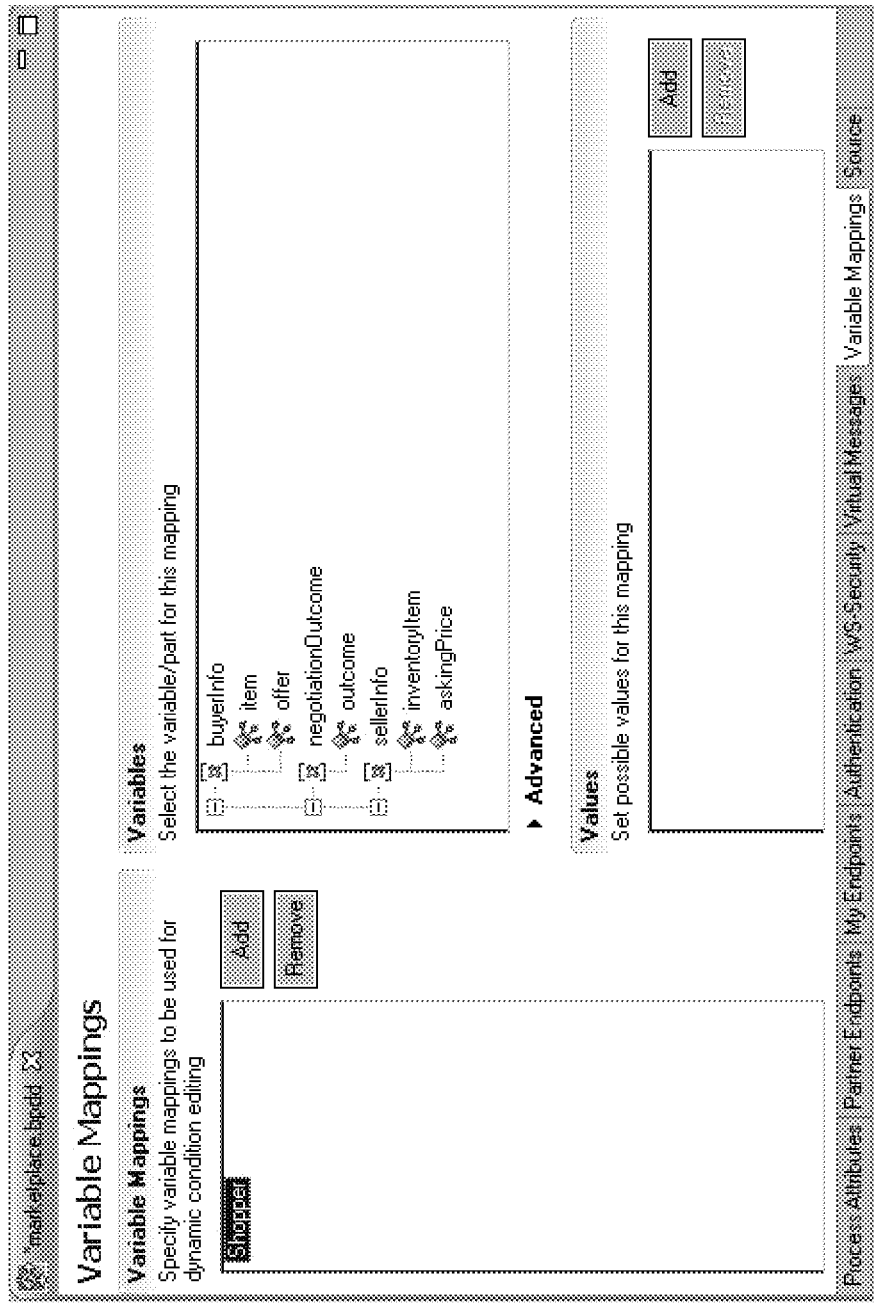
FIG. 11 is an exemplary dialog box for defining variable mappings, according to some embodiments of the present invention.

FIG. 11 is an exemplary dialog box for defining variable mappings, according to some embodiments of the present invention. To configure Variable Mappings, complete the following:
  Double-click the .bpdd file (e.g. marketplace.bpdd) in the Navigator view of the desired project. The .bpdd editor opens.
  Select the Variable Mappings tab, then click the Add button. The Add Variable Mapping dialog displays.
  In the Add Variable Mapping dialog, enter the name for the variable mapping and click the OK button. The variable is added to the Variable Mappings list.
  In the variable mappings list, select the new mapping. The Variables hierarchal menu and default values list will become visible.
  Select the item from the hierarchal menu to create the XPath expression. Advanced users can click the Advanced toggle and manually input the expression.
  In the Values section, you can specify default values that the analyst can select in the condition editor within the analyst UI.
  Deploy the new process.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for monitoring an overall health of a software project, the method comprising:
  providing a plurality of business process checkers;
  storing a plurality of criteria in one or more computer storage media, wherein each of the plurality of criteria measures an aspect of a plurality of aspects of the software project process, wherein the plurality of aspects include design, development, deployment, management and monitoring of the software project process;
  storing an upper bound parameter and a lower bound parameter of the threshold of values that are acceptable for a respective business process checker, in one or more computer storage media;
  electronically assimilating data related to the aspects of the software project process from one or more data sources storing data from the plurality of business process checkers;
  electronically calculating, by each business process checker, a score for each criterion, responsive to said upper bound and lower bound parameters and said data from said one or more data sources, wherein the score for a particular criterion is set to zero when an aspect of the software project process measured by the particular criterion is outside of said upper bound and lower bound parameters;
  electronically calculating an overall health score for the software project from calculated scores for each criterion;
  displaying on a display device, a user interface including a number of relevant checker processes, a description of corresponding business process checker, relevant links for obtaining more information about the relevant checker processes, and an indication of the overall health of the software project responsive to the calculated overall health score, wherein when any score for any criterion is higher than the upper bound parameter for a respective business process checker, the indication of the overall health for the software project is set to a low indication; and
  changing one or more of said plurality of criteria in real time to reflect changing business needs, utilizing the changed criteria by currently executing process checkers, re-calculating the score for each criterion and the overall health score in real time, and displaying the indication of the overall health in real time, according to the changed one or more of said criteria.

2. The method of claim 1, wherein the plurality of criteria are implemented in Business Process Execution Language (BPEL) and the plurality of business process checkers are configured to execute a respective criterion implemented in BPEL.

3. The method of claim 1, wherein said indication of the overall health of the software project is depicted in three different colors.

4. The method of claim 3, wherein said three different colors are displayed as three lights.

5. The method of claim 1, wherein said data from one or more data sources includes test statistics for the software project.

6. The method of claim 1, wherein said overall health score for the software project is calculated by multiplying each calculated score for each criteria.

7. The method of claim 1, wherein said plurality of business process checkers include a process checker for checking a ratio of new bugs and fixed bugs in the software project, during a given time period.

8. The method of claim 1, wherein said plurality of business process checkers include a process checker for checking compliance to a code review policy for the software project.

9. The method of claim 1, wherein said plurality of business process checkers include a process checker for checking to ensure a code base of the software project is increasing in size.

10. The method of claim 9, wherein when a total code base size is larger than a size for a previous drop in size, said process checker returns a Green indication, when the difference between the size for the previous drop is greater than a predetermined number of lines per developer, said process checker returns a Red indication; otherwise, said process checker returns a Yellow indication.

11. The method of claim 1, wherein said plurality of business process checkers include a process checker for checking an overall static analysis violation ratio per a predetermined number of lines of code.

12. The method of claim 1, wherein said plurality of business process checkers include a process checker for checking a confidence factor rating of the software project, and wherein said confidence factor is a number that is correlated to a chance of the software system working correctly for any task.

* * * * *